E. T. BURROWES.
METALLIC FRAME.
APPLICATION FILED JUNE 8, 1914.
1,152,073.
Patented Aug. 31, 1915.
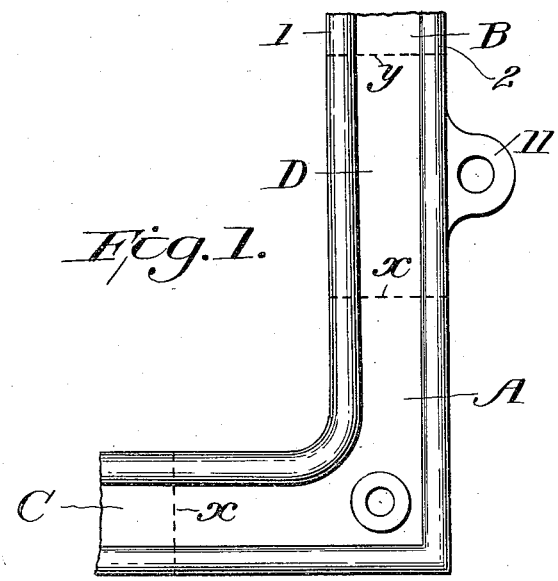
Fig. 1.
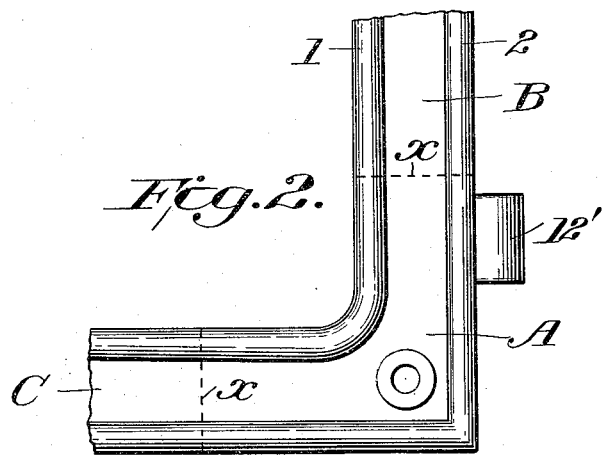
Fig. 2.
Fig. 3.
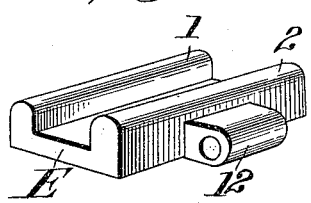
Witnesses
C. N. Walker.
A. W. Morris.
Inventor
E. T. Burrowes,
by
Watson & Boyden.
Attorneys.

UNITED STATES PATENT OFFICE.

EDWARD T. BURROWES, OF PORTLAND, MAINE.

METALLIC FRAME.

1,152,073.      Specification of Letters Patent.      Patented Aug. 31, 1915.

Original application filed September 2, 1913, Serial No. 787,698. Divided and this application filed June 8, 1914. Serial No. 843,702.

*To all whom it may concern:*

Be it known that I, EDWARD T. BURROWES, a citizen of the United States, residing at Portland, in the county of Cumberland and State of Maine, have invented certain new and useful Improvements in Metallic Frames, of which the following is a specification.

This invention relates to the construction of metal frames, such, for example, as are used in the manufacture of window screens, screen doors, and the like.

The present application is a division of my former application, Serial No. 787,698, filed Sept. 2, 1913, resulting in Patent No. 1,120,684, granted Dec. 15, 1914, and is also in the nature of an improvement over the construction shown in the patent to George H. Davis, No. 1,120,685, granted Dec. 15, 1914.

In the two above mentioned patents, there is disclosed a metallic frame consisting of solid forged corner pieces having side members welded thereto so as to form a closed frame.

The object of the present invention is to provide means for attaching fastening devices such as hinge elements and the like directly to such rigid frames.

In order that the invention may be readily understood, reference is had to the accompanying drawing, in which, Figure 1 is a fragmentary view illustrating the corner of a frame having one of my improved fastening elements embodied therein; Fig. 2 is a similar view showing a slightly different method of attaching a fastening element; and, Fig. 3 is a perspective view of still another form of fastening member which may be employed in connection with the corner pieces.

In the drawing A represents the corner pieces such as shown in my original patent above referred to, while B and C represent the side bars. These members are shown as channel shaped in cross section, and provided with flanges 1 and 2, so as to adapt them to receive a suitable wire holding molding when used for constructing screens. The invention, however, is not, of course, limited to structural elements of this particular cross section.

The corner-piece method of construction disclosed in the above mentioned Davis patent and in the patent of which this is a division makes it possible to insert special fastening pieces or members in the frame whenever desired. For instance, in Fig. 1 there is shown a fastening member D, carrying a perforated lug 11 adapted to receive a screw, or the like, for fastening the frame to a support. In assembling, a fastening piece such as D is selected from stock and is welded to the corner pieces A, as at *x*. A standard stock side member B is then welded to the other end of the fastening member D, as indicated at *y*.

In Fig. 3 there is shown a different fastening member E, provided with a hinge element 12. This is to be used in constructing frames which are to be mounted on hinges. Elements such as 12 may also be employed in connection with sliding screens, etc. The fastening elements may also, if desired, be formed directly on and integral with the corner pieces, as indicated at A′ and 12′ in Fig. 2. Or, the members D and E may be formed as integral extensions of such corner pieces.

It will be understood that the corner pieces A and the special fastening members of various kinds, such as D and E, are to be kept in stock and selected as desired by the workmen to meet any given requirements in constructing frames for different purposes.

What I claim is:

In a rigid metal frame, a separately formed corner piece, and side members welded thereto, one of said side members being composed of two sections welded together, one of said sections having a fastening element formed integral therewith.

In testimony whereof I have affixed my signature, in presence of two witnesses.

EDWARD T. BURROWES.

Witnesses:
    MARY SMALL,
    IDA F. MCNAIRN.

Copies of this patent may be obtained for five cents each, by addressing the "Commissioner of Patents, Washington, D. C."